July 26, 1938.　　　　E. A. DOYLE　　　　2,125,179
METHOD OF AND APPARATUS FOR REMOVING METAL
FROM THE SURFACES OF METALLIC BODIES
Filed Oct. 31, 1933　　　2 Sheets-Sheet 2

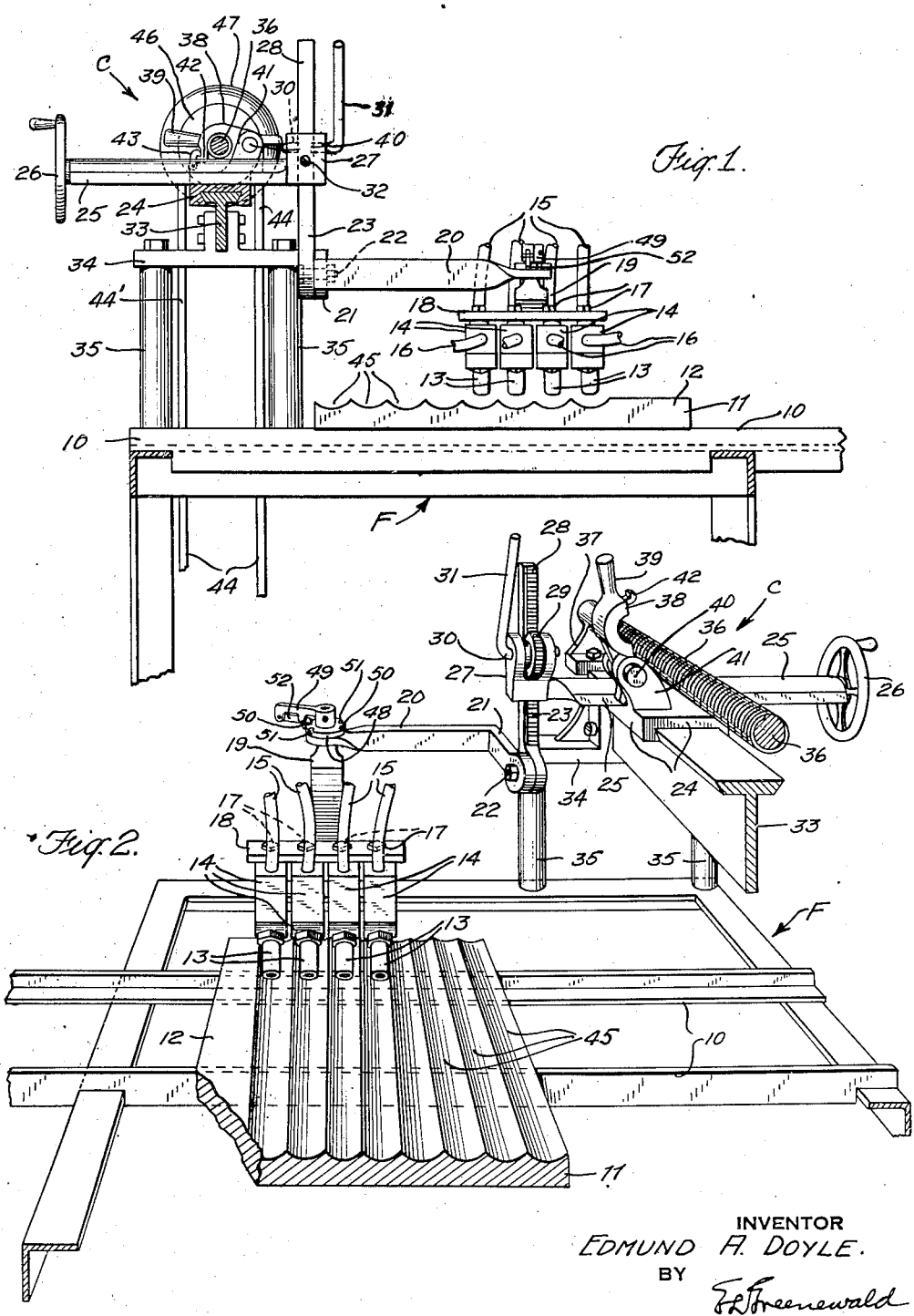

INVENTOR
EDMUND A. DOYLE
BY
ATTORNEY

Patented July 26, 1938

2,125,179

UNITED STATES PATENT OFFICE 2,125,179

METHOD OF AND APPARATUS FOR REMOVING METAL FROM THE SURFACES OF METALLIC BODIES

Edmund A. Doyle, Brooklyn, N. Y., assignor, by mesne assignments, to Union Carbide and Carbon Corporation, a corporation of New York Application October 31, 1933, Serial No. 696,004

18 Claims. (Cl. 148—9)

My invention relates to a method of and apparatus for desurfacing or thermo-chemically removing surface metal from the surfaces of bodies of ferrous metal.

It has been the practice heretofore to employ portable chipping tools and heavy machine tools such as planing, shaping, milling, and chipping machines, for removing or cutting metal from the surfaces of metallic bodies. Such tools are not entirely satisfactory, because they remove metal at a very slow rate. Moreover, in peeling the surface layer from an ingot, billet, or the like to remove defective metal and expose other defects such as cracks or fissures, a mechanical tool often peens over and smooths such defects so that they become invisible to the operator but they may later appear in the finished product made from the steel, which product must then be scrapped. To avoid the losses due to rejects, it is common practice to subject the unfinished steel to a pickling treatment to expose such defects, so that the latter may be eliminated before additional operations are performed on the steel. Further, heavy machine tools are expensive and their operating costs are high because a substantial amount of power is required for relatively moving the cutting tool and/or the metallic body, one with respect to the other, to perform the cutting operation.

Within the last few years the objections of heavy machine tools and portable chipping tools have been avoided by employing blowpipes having nozzles particularly adaptable for removing surface metal from metallic bodies. These nozzles are constructed so as to permit the passage of a comparatively large volume of oxidizing gas at a relatively low velocity in such a manner that surface metal is removed and cuts or grooves are produced having gradually sloping sides.

It has been the practice, particularly in removing seams and defects in bars or billets or other semi-finished shapes in steel mill operations, to remove surface metal at a seam or defect by passing a single blowpipe nozzle over the surface and along the defect. Although a single blowpipe nozzle can be readily used when removing narrow strips of surface metal, it is not entirely satisfactory to employ a single blowpipe nozzle when it is desired to remove an entire surface or large areas of surface metal. Since the maximum width of cut which can be made with the sizes of blowpipe nozzles now constructed is 2 inches, additional parallel cuts must be made when large areas of surface metal are to be removed.

By making a plurality of parallel cuts with a single blowpipe nozzle, considerable overlapping of cuts occurs which reduces the economy in the amount of oxidizing gas required to remove a large area of surface metal. Further, there is a tendency generally for fin material to remain at least on one side of each individual cut. The formation of fins is due to the washing effect of the slag as it is forced out of a cut and over the adjacent surface of the work by the force of the oxidizing gas stream. The slag may comprise both oxidized metal and fused or molten metal, and the latter has a tendency to freeze on the sides of a cut and is exceedingly difficult to remove. Generally these fins of molten metal are removed after solidifying by a hand scraper. The time and labor costs in removing the fin material are decidedly objectionable.

In the practice of my invention, I have overcome the above objections and employ a plurality of blowpipe nozzles so arranged that an extremely wide area of surface metal can be removed in a single passage along the surface. To this end, oxidizing gas streams issuing from the orifices of a number of blowpipe nozzles are simultaneously applied and spaced so that the resulting puddles merge across a considerable width of surface metal or a sufficient number of nozzles may be used to cover the entire width of a surface to be removed. The blowpipe nozzles and/or the metallic body are moved relatively one with respect to the other, the blowpipe nozzles themselves being relatively close to the surface whereby metal is removed simultaneously from successive portions of the surface of the metallic body over the entire width of a cut. By removing an entire surface or large area of surface metal in this manner, the amount of fin material tending to adhere between the cuts or channels, which are produced by a plurality of oxidizing streams acting simultaneously, is reduced appreciably, thereby substantially reducing labor costs in removing fin material after a large area of surface metal has been removed.

The object of my invention, therefore, is to thermo-chemically remove areas of surface metal from metallic bodies in a single surface removing operation with a plurality of oxidizing gas streams acting simultaneously on the surfaces of such bodies.

Another object is to provide an improved apparatus for thermo-chemically removing large areas of surface metal with a plurality of oxidizing gas streams.

The above and further objects and the novel features of my invention will become apparent from the following description and the accompanying drawings, in which Fig. 1 is a transverse sectional view of apparatus embodying the principles of my invention;

Fig. 2 is a perspective view of the apparatus illustrated in Fig. 1;

Figure 3:
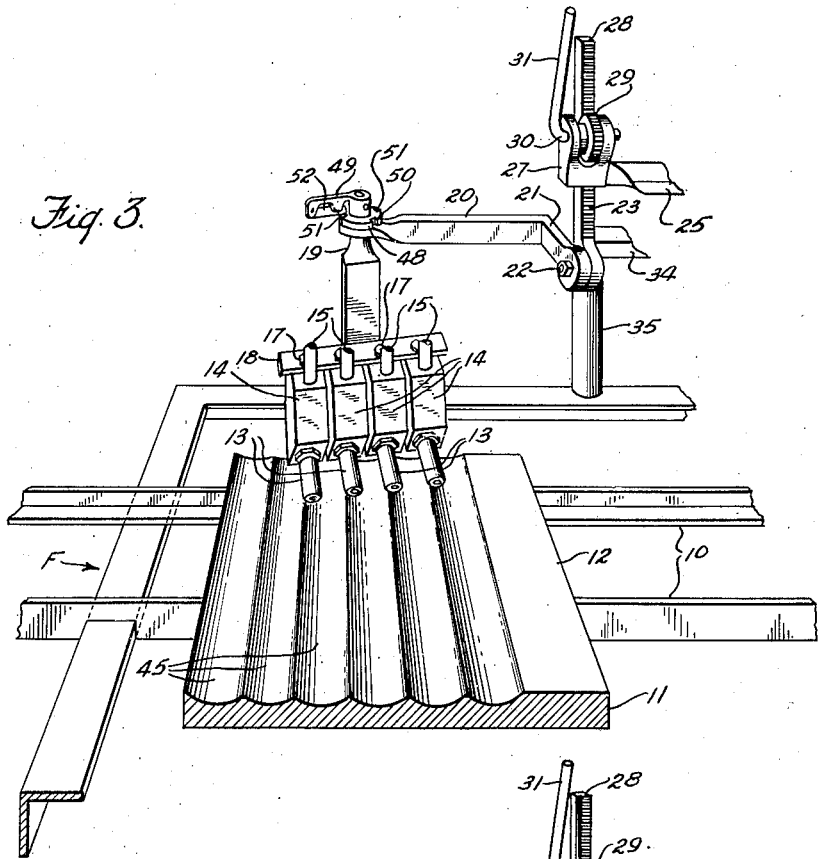
Fig. 3 is a perspective view of the blowpipe mechanism of Fig. 2, showing the nozzles oriented or positioned to deliver gas streams laterally at an acute angle relatively to the direction of movement of the nozzles.

In desurfacing metal bodies with an oxidizing gas stream, the reaction which causes the removal of metal produces a puddle of molten material upon which the stream impinges; the puddle containing both melted metal and oxidized metal. To initiate the reaction, the surface metal must be raised to its ignition or kindling temperature before the oxidizing gas stream is applied thereto. While the entire metallic body can be raised to an ignition temperature, as in a furnace, it is preferable to raise successive portions of the surface metal to be removed to an ignition temperature prior to the application of the oxidizing gas stream. The blowpipe nozzles employed for this purpose discharge a comparatively large volume of oxidizing gas at a low velocity, as hereinafter more fully explained.

The depth and width of cut obtained in any particular case is dependent upon several factors. These factors are the size and velocity of the oxidizing gas stream; the acute angle at which the oxidizing gas stream is applied to the surface of a metallic body; and the rate of relative movement between the oxidizing gas stream and the metallic body. After the size and velocity of the oxidizing gas stream have initially been determined, it is of considerable importance that the angle at which the oxidizing gas stream is applied to the metallic bodies and the rate of relative movement between the bodies and oxidizing gas stream be maintained substantially constant, so as to produce channels which are uniform in character and dimension. For this purpose it is desirable to provide apparatus having proper adjustments for applying and maintaining the oxidizing gas stream at any given acute angle with respect to the surface of a metallic body. Further, it is desirable to provide driving mechanism which can be readily controlled for adjusting the rate of relative movement of the oxidizing gas stream and metallic body.

Referring to the drawings, the apparatus for removing surface metal in accordance with the principles of my invention may comprise a supporting frame F having a bed or table 10 upon which the work, such as a steel slab 11, is placed. Where surface metal is to be removed from a large number of duplicate pieces, as in steel mill operations, suitable apparatus may be provided for placing the work on and removing the work from the table 10. Disposed above the slab 11 and at an acute angle to the top surface 12 thereof is arranged a plurality of blowpipe nozzles 13 adapted to move relatively to the slab 11 for progressively applying heating flames and oxidizing gas streams obliquely against and lengthwise of successive portions of the top surface 12 to remove surface metal therefrom.

The blowpipe nozzles 13 are so constructed that they will permit the passage of a comparatively large volume of oxidizing gas at a relatively low velocity, and may comprise a central passage for an oxidizing gas to provide an oxidizing gas stream. A plurality of passages surrounding the central passage may be provided for a combustible gas to produce a heating flame to raise the metal to be removed to an ignition temperature. Nozzles of this character are described and claimed in W. S. Walker and W. J. Jacobsson application, U. S. Serial No. 536,254, filed May 9, 1931.

As shown in the drawings, four nozzles 13 are arranged parallel to and alongside each other in a row for removing a comparatively wide area of surface metal from the top surface 12 of the slab 11. The nozzles 13 are threadedly secured to nozzle heads 14 having an oxidizing gas passage and a combustible gas passage communicating with similar passages in the nozzles 13. The oxidizing gas, such as oxygen or a mixture of oxygen and air, and a combustible gas, such as a mixture of oxygen and acetylene, are delivered to the heads 14 through conduits 15 and 16, respectively, from suitable sources of supply (not shown).

The nozzles 13 are maintained in position and properly spaced by securing their respective nozzle heads 14 by cap screws 17 to a crossbar 18 which is secured to the downwardly sloping arm 19 of a bracket 20. Another arm 21 on the bracket 20 is pivotally mounted at its end by a cap screw 22 to the lower end of a vertically movable member 23. By pivotally mounting the bracket 20 on the vertical member 23, the angle of the nozzles 13 with respect to the top surface 12 of the slab 11 can readily be adjusted.

The nozzles 13 and the parts of the apparatus just described are mounted on or connected to a carrier, such as a carriage C having mechanisms for adjusting the nozzles 13 transversely and vertically with respect to the surface 12 of the slab 11. The carriage C comprises a base plate 24 and a slide 25 in dove-tailed engagement therewith, the slide 25 being movable transversely of the frame structure F by mechanism on the carriage C which is actuated by turning a hand wheel 26. The vertical member 23 extends through an opening of a guide block 27 which is secured to the end of the slide 25 opposite the handwheel 26. On the vertical member 23 is formed a toothed rack 28 which engages a pinion 29 secured to a shaft 30 journaled in the guide block 27 and having a right angle extension 31. The extension 31 serves as a handle which, when turned, rotates the pinion 29 so as to move the toothed rack 28 and adjust the nozzles 13 vertically with respect to the slab 11 and toward and away from the surface 12. The nozzles 13 can be maintained at a given vertical position by locking the vertical member 23 in the guide block 27 by a set screw 32, as shown in Fig. 1.

The base plate 24 of the carriage C is in dovetailed engagement with and movable along a T-shaped rail 33 extending longitudinally of the frame structure F, the ends of which rail are fixed in brackets 34 attached to standards 35 mounted on the frame structure F. Above and parallel to the rail 33 is arranged a lead screw 36 for driving the carriage C, the ends of which are journaled in brackets 37 attached to the ends of the rail 33. A cap 38 internally threaded to form a half nut for engaging the carriage C to the lead screw 36 is provided with a handle 39 and is pivotally connected at 40 to a forked arm 41 attached to the base plate 24. The cap 38 is maintained in operative engagement with the lead screw 36 by a notched lug 42, as shown in Fig. 1; and this lug is adapted to be engaged by a pawl 43 pivotally mounted on the base plate 24 and resiliently biased, as by a spring (not shown), toward the lug 42.

The apparatus may also be provided with means whereby the surface metal may be removed during the movement of the carriage C in either direction by the lead screw 36. For this purpose the downwardly extending arm 19 which supports the blowpipe nozzles 13 is pivoted on the bracket 20 so that all the nozzles may be simultaneously turned as a unit and in a plane substantially parallel to the surface of the metal to be removed. The bracket 20 is provided with a hub 48. The upper end of the arm 19 is rounded and is journaled in the hub 48. A handle 49 is secured to the upper end of the arm 19 above the bracket 20. In the event the direction of the nozzles 13 is reversed, the axis of the hub 48 would be arranged perpendicular to the surface 12 so that the nozzles 13 could be turned in a plane parallel to the surface of the metal in order to maintain the same angle between the nozzles 13 and the surface 12 when the nozzles are traveling in either direction. In this case the desired angle of the nozzles may be fixed or a means for adjusting the angle may be placed at the lower end of the arm 19. The hub 48 is provided with notches 50 and 51. The handle 49 carries a latching mechanism 52 adapted to engage the notches 50 and 51 and thereby fix the line of direction of the nozzles 13 as may be determined by the angular position of the notches 50 and 51 on the circumference of the hub 48. As many notches may be provided as may be necessary to set the nozzles 13 in the desired directions. As shown herein in Fig. 2 the notch 50 occupied by the latch 52 is so positioned that when engaged by the latch the nozzles 13 will be directed in planes substantially parallel to the line of travel of the carriage C. In the position shown in Fig. 2 the nozzles 13 are set to remove metal while the carriage C is traveling in the forward direction toward which the nozzles are directed. When the latch 52 occupies the opposite notch 50 the line of direction of the nozzles 13 will be turned through 180° and the nozzles 13 will be set to remove metal when the carriage C is traveling in the opposite direction on its return stroke. The notches 51 are provided to set the line of direction of the nozzles 13 as a group slightly inclined to the line of travel of the carriage C as shown in Fig. 3. The notch 51 adjacent to the latch 52 is provided to incline the line of direction of nozzles 13 while the carriage is traveling in the direction in which the nozzles are pointing in Fig. 2. The opposite notch 51 is provided to be engaged by the latch 52 when the nozzles 13 are to be set at an angle transversely to the line of travel of the carriage C when the carriage is traveling in the reverse direction.

Suitable driving means, such as a variable speed electric motor, may be provided to drive a belt 44, which is connected to a pulley 46 secured to one end of the lead screw 36 for rotating the same. A handwheel 47 may also be provided for lead screw 36.

The practice of the method and the operation of the apparatus illustrated in the drawings are substantially as follows: It will be assumed that the lead screw 36 is driven by the belt 44 at such a speed that the carriage C will move at the desired rate along the rail 33; that the cap 38 on the carriage C is disengaged from the lead screw 36; that the carriage C is at one end of the frame structure F with the nozzles 13 clear of the slab 11; that the nozzles 13 have been correctly positioned transversely by turning the handwheel 26; that the nozzles 13 have been adjusted at the desired acute angle with respect to the surface 12 of the slab; that the handle 31 has been turned to adjust the nozzles 13 vertically with respect to the surface 12 of the slab; and that the conduits 16 are supplied with a mixture of oxygen and acetylene. With the above assumed conditions, the combustible gas issuing from the nozzles 13 is ignited and the carriage C is moved manually so that the heating flames will be applied on a wide area at one edge of the slab 11. As soon as this area or strip has reached an ignition temperature, oxygen is supplied to the conduits 15 and the cap 38 is turned to its downward position so that the carriage will be advanced lengthwise of the work by the lead screw 36. The oxidizing gas streams issuing from the nozzles 13 will then oxidize the surface metal which has been raised to an ignition temperature by the heating flames, and this oxidized metal along with molten metal will be blown ahead of the nozzles 13 by the force of the oxidizing gas streams.

The nozzles 13 are moved relatively fast along the surface 12 of the slab 11 with the heating flames, together with the molten metal and oxides, raising successive surface portions to an ignition temperature, and with the oxidizing gas streams oxidizing the successive surface portions which have been raised to an ignition temperature. During the entire operation, all of the oxidizing gas streams are applied simultaneously obliquely against and lengthwise of successive portions of heated surface metal as the nozzles 13 are moved relatively to the slab 11. Therefore, at every point in the travel of the nozzles 13, superficial metal combustion is effected upon a transverse zone of said surface and all of the oxidized and molten metal across the entire relatively wide strip of surface metal removed is blown ahead of the cut by the force of the oxidizing gas streams.

When the cut has been completed, the cap 38 is disengaged from the lead screw 36, and the carriage moved back to its starting position for making another wide cut. When desired surface metal may also be removed from the body metal on the return stroke of the carriage C. In this case the lead screw driving mechanism is stopped at the end of the cut; the nozzles 13 are turned through 180° by the handle 49; and the carriage driving mechanism including the lead screw 36 is reversed to drive the nozzles in the opposite direction. Although I have described a cut started at one edge of a metallic body, it is to be understood that cuts may be started at points intermediate the edges of the body. Also, additional nozzles may be provided to remove metal from an entire surface of a metallic body in a single operation beginning adjacent one end of a longitudinal surface and continuing progressively at a uniform rate longitudinally of said surface to the opposite end thereof while the oblique angle of impingement of the oxidizing gas streams against said surface are maintained substantially constant.

Although a wide strip of surface metal is removed when a plurality of nozzles 13 are employed simultaneously, the oxidizing stream issuing from the orifice of each nozzle produces its own independent groove or channel having gradually sloping sides, as indicated at 45 in Figs. 1 and 2. Since metal is removed from successive surface portions at the same time across the entire strip affected by the touching oxidizing gas streams, the tendency to form fin material between the contiguous parallel shallow channels or grooves 45 is diminished considerably as the oxidized and molten metal across the entire strip is blown ahead of the region of impingement of the oxidizing gas streams and upon surface portions to be removed.

Figure 4:
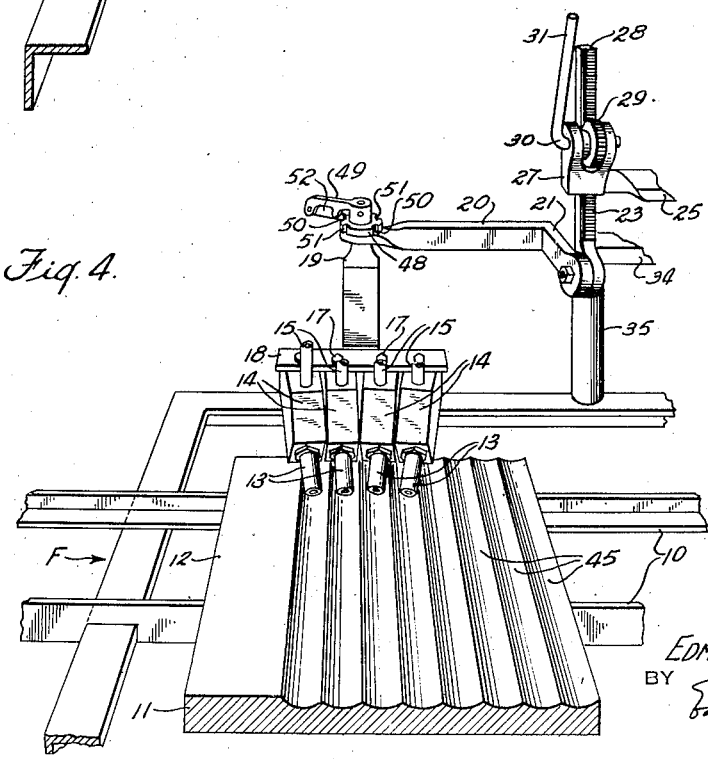
Fig. 4 is a similar view showing the blowpipe nozzles oriented mutually toward each other and positioned to deliver gas streams slightly converging toward one another.

In order to make as wide a cut as possible, the nozzles 13 are positioned substantially parallel to each other, as shown in Figs. 1 and 2. In this manner maximum economy in the consumption of oxidizing gas is effected with a reduction in the formation of fin material. When it is desired to further decrease the amount of fin material formed when a plurality of oxidizing gas streams are employed simultaneously for making a cut, the nozzles 13 are so arranged that the oxidizing gas streams will converge slightly toward each other as shown in Fig. 4. This may be desirable in certain instances even though a narrower cut is made. This arrangement may also reduce the height of the ridges between the grooves.

It has previously been mentioned that the molten metal and oxides produced aid the heating flames in heating successive surface portions to be removed to an ignition or kindling temperature. When the nozzles 13 are inclined to their line of travel, as when the latch 52 is engaged in one of the notches 51, it is preferable that the angle of inclination is such that the oxidizing gas stream will have a sufficient component of force in the direction of general movement of the nozzles, so that molten metal and oxides will tend to be blown ahead on surface metal to be removed. In this way the slag will still aid the heating flames to insure heating surface metal to be removed to an ignition temperature. In certain instances, nozzles have been inclined about 10 degrees to their line of travel, it being understood, of course, that the nozzles are pointed in the direction of the successive portions from which metal is to be removed. With different conditions encountered in practice, however, the angle of inclination of the nozzles will vary from that specified above.

It may be noted that when the nozzles are inclined to their general direction of movement, slightly wider cuts or grooves are produced by each individual nozzle. While the oxidizing stream has a component of force in the direction of the successive surface portions from which metal is to be removed, the angle of inclination of the nozzles tends to sweep the slag sideways off of the surface of the metallic body. However, when the nozzles are parallel to their general direction of movement, faster cuts can generally be made because all of the slag is effectively utilized to aid the heating flames in heating surface metal to the ignition temperature before being subjected to the action of the oxidizing gas streams.

In order that the nozzles 13 can be arranged to mutually converge slightly toward each other or so that they make transverse angles with the direction of the travel of the nozzles with respect to the work in the present embodiment of my invention as shown in Fig. 4, the nozzle heads 14 are spaced from each other on the crossbar 18 and are pivotally adjustable thereon by means of the cap screws 17. This adjustment may also be used to direct the line of direction of the nozzles slightly crosswise of the cut being made.

It has been stated that the oxidizing gas streams blow away oxidized and molten surface metal, and this mixture of oxidized and molten metal has been termed a "slag". Although the surface metal removed can be reduced completely to an oxidized form, it has neither been desirable nor necessary to do so in practice. For example, it has been calculated that approximately $4\frac{2}{3}$ cubic feet of oxygen are required to oxidize completely one pound of an ordinary grade of low carbon steel containing about 0.2% carbon. In actual practice it has been possible to remove a pound of this steel with approximately 2 cubic feet of oxygen. It is therefore apparent that a portion of the surface metal removed is in an oxidized state, and that the remaining portion is in a partially oxidized state and in an unoxidized state or molten form. By removing a substantial portion of surface metal without completely oxidizing the same, considerable economy can be effected in the amount of oxidizing gas required to remove or make cuts in the surfaces of metallic bodies.

It has been stated that the nozzles 13 are of such a type that they will permit the passage of a comparatively large volume of oxidizing gas at a relatively low velocity. In practice it has been determined that the best results under average conditions are obtained in most cases when the pressure of the oxidizing gas is adjusted to produce oxidizing gas streams having a velocity between 550 and 750 feet per second. In some instances it may be desirable to employ oxidizing gas streams as low as 200 feet per second or lower, and in other instances it may be desirable to increase the velocity of the oxidizing gas streams to 1,000 feet per second. The velocities of gas mentioned herein are the calculated discharge velocities of the gas passing through the discharge orifice of the blowpipe nozzle, it being assumed that the volume of gas discharged in a given time is at atmospheric pressure and at the temperature of 70 degrees F.

Satisfactory cuts have been made with the nozzles 13 adjusted at acute angles varying from 10 to 35 degrees with respect to the surface of the work. The widths of the grooves produced by the oxidizing gas streams tend to increase with an increase in the acute angles at which the nozzles are set.

It has been mentioned above that the nozzles 13 are moved relatively fast over the surface of the slab 11. In any particular case, in order to economize time, the nozzles are preferably moved relatively to the work at the maximum speed which will still produce grooves or cuts 45 of the desired depth and width. At very slow speeds, satisfactory cuts are not obtained due to the digging tendency of the oxidizing gas streams. This digging or piercing is caused by the metal slag piling up ahead of the nozzles. In order to avoid this digging into the surface of the work, the oxidizing streams are moved relatively to the work at a uniform rate sufficient to prevent the oxidizing gas streams being applied for too long a time at any particular portion of the surface of the work. By way of example, satisfactory cuts have been made on cold metal by moving nozzles relatively to the work at speeds varying from 4 to 90 feet per minute i. e., at a rate higher than that conventionally employed for cutting metal by means of an oxygen jet. For example, when using well known high-velocity oxygen jets for cutting or severing mild or structural steel at room temperature, conventional machine cutting speeds for propelling the cutting nozzle or blowpipe relatively to the steel body vary from about 2.4 inches per minute for steel of 12 inches thickness to about 32 inches per minute for steel of one-eighth inch thickness.

It will thus be seen that surface metal can be removed in the manner described above from a relatively large area, or the entire surface of a metallic body, and that a plurality of contiguous parallel shallow channels or grooves having ridges therebetween are formed. When it is desired to make cuts of relatively great depth the ridges formed between the cuts are proportionately higher. In steel mill operations in removing surface metal in this manner, these ridges are particularly useful in the rolling of billets and metallic bodies. It has been found that such billets can be handled with a minimum amount of trouble as the ridges between the grooves are readily gripped by the rolls to thus maintain the billets in proper alignment while passing through the rolls.

Ordinarily all surface defects are removed in a single pass of the nozzles relatively to the metallic body. In some instances the defects are relatively deep or additional defects are exposed after a surface layer of metal has been removed. In such instances a second layer of surface metal may be removed. In order to reduce the amount of surface metal removed and the quantity of oxidizing gas used in making a second cut, however, it may be preferable to supply the combustible and oxidizing gases only to the nozzles which will remove additional surface metal in the grooves where further surface defects are visible. After a large area of surface metal is removed, therefore, an operator can easily inspect the new surface and, if it is necessary to remove additional metal in one or more grooves, this can be readily accomplished by moving the carriage C to its starting position and supplying combustible and oxidizing gases only to those nozzles in a position to operate on the surface portions having defects. Since certain changes in carrying out the above process and in the constructions set forth, which embody the invention, may be made without departing from its scope, it is intended that all matter contained in the above description or shown in the accompanying drawings shall be interpreted as illustrative and not in a limiting sense.

I claim:

1. The method of thermochemically desurfacing a body of ferrous metal preparatory to the formation of a finished product, which comprises heating to its ignition temperature a region extending across at least a substantial portion of a surface of the body transversely to the direction in which a desurfacing operation is to advance by the application of a plurality of heating gas streams distributed across said region, impinging a relatively large amount of low velocity oxidizing gas upon said region at an acute angle to said surface by the employment of a plurality of streams of oxidizing gas distributed across said region in association with said heating gas streams and positioned sufficiently close that the reaction puddles formed by said streams merge, orienting or positioning said plurality of gas streams as a group about an axis perpendicular to said surface so as to make a desired acute angle laterally with respect to said direction of advance, and causing the advance of said group of gas streams over said body in said direction to effect removal of a relatively thin stratum of metal from at least a major portion of the surface of said body in contiguous paths.

2. The method of thermochemically desurfacing a body of ferrous metal preparatory to the formation of a finished product, which comprises heating to its ignition temperature a region extending across at least a substantial portion of a surface of the body transversely to the direction in which the desurfacing operation is to advance by the application of a plurality of heating gas streams distributed across said region, impinging a relatively large amount of low velocity oxidizing gas upon said region at an acute angle to said surface by the employment of a plurality of streams of oxidizing gas distributed across said region in association with said heating gas streams and positioned sufficiently close that the reaction puddles formed by said streams merge, orienting or positioning said plurality of gas streams as a group about an axis perpendicular to said surface so as to make a desired acute angle laterally with respect to said direction of advance, and moving said group of gas streams in one or more passes over said body while holding the latter stationary to effect removal of a relatively thin stratum of metal to a substantially uniform depth along each of the contiguous channels formed.

3. Billet desurfacing apparatus comprising a billet table, a spaced rail extending parallel to said billet table, a movable carriage on said rail, means for driving said carriage in either direction along said rail, a support with means for holding billet desurfacing torches, and means connecting said support to said carriage, such connecting means being rotatable to swing the torches into position so that a billet desurfacing operation can be effected when said carriage travels in either direction along said rail.

4. Apparatus for thermochemically desurfacing metallic bodies comprising a carriage, means for supporting a metallic body at one side of said carriage, means for moving said carriage in a direction parallel to said body, a plurality of nozzles inclined at an acute angle to the surface of the body in the direction of advance during a desurfacing operation, an arm with holders for supporting said torches in close position adjacent to each other to desurface a body at one side of said carriage, and a swivel connection between said arm and said carriage on which said arm is rotatable to move said torches into position to desurface a metallic body when said carriage travels in either direction.

5. Apparatus for thermochemically desurfacing bodies of ferrous metal comprising the combination with means for supporting a body, of a frame disposed adjacent to said supporting means, a plurality of nozzles disposed closely adjacent to each other to deliver touching oxidizing gas streams impinging upon a series of points extending across a surface of the body, means for connecting said nozzles to said frame, said connecting means being rotatable to swing said nozzles as a unit through an angle of 180° in a plane parallel to the surface operated upon, and means for moving said frame and the body relatively to each other in either direction.

6. Apparatus for thermochemically desurfacing bodies of ferrous metal comprising the combination with means for supporting a body, of a carriage movable with respect to the body, a plurality of nozzles disposed closely adjacent to each other to deliver touching oxidizing gas streams impinging upon a series of points extending across the surface of the body, means for carrying said nozzles including a frame supported by said carriage and depending therefrom, means for moving said carriage in either direction with respect to the body to effect a desurfacing operation, means for adjusting said frame transverse to such movement of said carriage for positioning the nozzles over the surface, means for moving said nozzles toward and away from the surface of the body operated upon, and means for swinging said nozzles as a unit through an angle of 180° in a plane parallel to the surface for effecting desurfacing when said carriage moves in either direction.

7. A method of thermo-chemically removing a shallow layer of metal from a surface of a ferrous metal body, which comprises heating at least a portion of said surface to an ignition temperature; discharging a low-velocity voluminous stream of oxidizing gas from nozzle means against such heated surface to produce a zone of superficial metal combustion upon said surface; effecting continuous relative movement of said body and said nozzle means in a fixed direction substantially parallel to the plane of said surface and at a uniform rate higher than that conventionally employed for severing metal by means of an oxygen jet; and, during such relative movement, continuously discharging such oxidizing gas stream obliquely against and along said surface and also at an acute angle laterally relatively to such direction of movement to continuously advance the zone of superficial metal combustion along said surface and remove a shallow layer of metal therefrom.

8. Apparatus for thermo-chemically removing a layer of metal from a surface of a ferrous metal body, such apparatus comprising, in combination, a blowpipe carrier; mechanism for effecting relative movement of said body and said carrier in a fixed direction substantially parallel to said surface; and a blowpipe mounted on said carrier and having a nozzle disposed to discharge a heating medium and an oxidizing gas stream obliquely against and along said surface and also at an acute angle laterally relatively to such direction of movement.

9. Apparatus for thermo-chemically removing a layer of metal from a surface of a ferrous metal body, such apparatus comprising, in combination, blowpipe means constructed and arranged to deliver a heating medium and an oxidizing gas stream obliquely against said surface to effect superficial metal combustion along a transverse zone of said surface; a carrier for said blowpipe means; mechanism for effecting relative movement of said carrier and said body in a fixed direction substantially parallel to said surface; and means for connecting said blowpipe means to said carrier, such connecting means including a pivoted member turning about an axis that is substantially perpendicular to the plane of said surface and arranged so that said blowpipe means may be set to deliver said gas stream at various angles measured laterally relative to said direction of movement.

10. A method of thermo-chemically removing a layer of metal from a surface of a ferrous metal body, which comprises discharging a heating medium and a row of low-velocity voluminous streams of oxidizing gas from nozzle means against a relatively wide zone of said surface to effect superficial metal combustion along said zone; effecting relative movement of said body and said nozzle means in a fixed direction substantially parallel to said surface; and, during such relative movement, discharging said streams obliquely against said surface and also at an acute angle laterally relatively to such direction of relative movement, to advance such zone of combustion along said surface and remove a layer of metal therefrom.

11. Apparatus for thermo-chemically removing metal from a surface of a ferrous metal body, such apparatus comprising, in combination, a blowpipe nozzle carrier; mechanism for effecting relative movement of said body and said carrier in a fixed direction substantially parallel to said surface; and a row of blowpipe nozzles mounted on said carrier and having the axes of their oxidizing gas discharge orifices disposed both obliquely relatively to said surface and at an acute angle laterally with respect to such direction of relative movement, whereby said nozzles are constructed and arranged to discharge oxidizing gas streams obliquely against said surface and also at an acute angle laterally relatively to such direction of movement.

12. Apparatus for thermo-chemically removing metal from a surface of a ferrous metal body, such apparatus comprising, in combination, blowpipe nozzles constructed and arranged to deliver a heating medium and oxidizing gas streams obliquely against said surface to effect superficial metal combustion along a transverse zone of said surface; mechanism for effecting continuous relative movement of said nozzles and said body in a fixed direction substantially parallel to said surface; and turning and positioning means for turning said nozzles in unison about an axis substantially perpendicular to the plane of said surface and for setting said nozzles in a position to deliver said gas streams at an acute angle laterally relatively to such direction of movement.

13. Apparatus for thermo-chemically removing metal from a surface of a ferrous metal body, such apparatus comprising, in combination, a plurality of blowpipe nozzles constructed and arranged to deliver a heating medium and oxidizing gas streams obliquely against said surface to effect superficial metal combustion along a transverse zone of said surface; a carrier for said nozzles; mechanism for effecting continuous relative movement of said carrier and said body in a fixed direction substantially parallel to said surface; and means for securing each of said blowpipe nozzles individually in spaced relation to said carrier, such connecting means including a pivoted member turning about an axis that is substantially perpendicular to the plane of said surface, the construction and arrangement being such that said blowpipe nozzles may be set to deliver oxidizing gas streams at angles that may be varied individually and collectively, said angles being measured laterally relative to said direction of movement.

14. A method of thermo-chemically removing a layer of metal from a surface of a ferrous metal body, which comprises heating at least a portion of said surface to an ignition temperature; discharging a plurality of convergent low-velocity voluminous streams of oxidizing gas from nozzle means obliquely against such heated surface; and effecting relative movement of said body and said nozzle means in a fixed direction substantially parallel to the plane of said surface.

15. A method of thermo-chemically removing a layer of metal from a surface of a ferrous metal body, which comprises discharging a heating medium and a plurality of convergent low-velocity streams of oxidizing gas from nozzle means obliquely against said surface to effect superficial metal combustion along a relatively wide zone of said surface; and effecting relative movement of said body and said nozzle means in a fixed direction substantially parallel to said surface to advance such zone of combustion along said surface and remove a layer of metal therefrom.

16. Apparatus for thermo-chemically removing a layer of metal from a surface of a ferrous metal body, such apparatus comprising, in combination, a blowpipe nozzle carrier; mechanism for effecting relative movement of said body and said carrier in a fixed direction substantially parallel to said surface; and a plurality of nozzles mounted on said carrier and having the axes of their oxidizing gas discharge orifices disposed both obliquely relatively to said surface and in convergent relation to each other, whereby said nozzles are constructed and arranged to deliver convergent oxidizing gas streams obliquely against said surface.

17. Apparatus for thermo-chemically removing metal from a surface of a ferrous metal body, such apparatus comprising, in combination, blowpipe means constructed and arranged to deliver a heating medium and a stream of oxidizing gas obliquely against said surface to effect superficial metal combustion along a transverse zone of said surface; a carrier for said blowpipe means; mechanism for effecting relative movement of said body and said carrier in either of two opposite directions substantially parallel to said surface; and means for connecting said blowpipe means to said carrier, such connecting means including a pivoted member turning about an axis substantially perpendicular to the plane of said surface, and constructed and arranged to permit turns through angles of at least 180° so that said blowpipe means may be set to deliver oxidizing gas and advance in one direction for effecting the thermo-chemical removal of metal from said surface and then reversed for effecting similar surface metal removal in the opposite direction.

18. A method of thermo-chemically removing surface metal from a surface of a ferrous metal body which comprises heating to its ignition temperature at least a portion of said surface; simultaneously applying at least two relatively low-velocity oxidizing gas streams, severally obliquely against and along adjoining portions of said surface; effecting relative movement between said body and said streams uniformly in a direction substantially parallel to and longitudinally of said surface; and during such movement, maintaining said streams oriented at an acute angle laterally of said direction of movement, whereby one of said streams impinges against successive portions of surface metal adjacent to but behind the surface portions impinged by the other stream.

EDMUND A. DOYLE.